United States Patent [19]

Fujisawa

[11] Patent Number: 5,029,224

[45] Date of Patent: Jul. 2, 1991

[54] MARKED REGION RECOGNITION APPARATUS

[75] Inventor: Tetsuo Fujisawa, Urawa, Japan

[73] Assignee: Ricoh Company, Ltd., Japan

[21] Appl. No.: 468,174

[22] Filed: Jan. 22, 1990

[30] Foreign Application Priority Data

Jan. 27, 1989 [JP] Japan .................................. 1-16431

[51] Int. Cl.$^5$ .................................................. G06K 9/00
[52] U.S. Cl. ........................................ 382/22; 382/48; 358/453
[58] Field of Search ...................... 358/453; 382/22, 48

[56] References Cited

U.S. PATENT DOCUMENTS

| | | | |
|---|---|---|---|
| 4,334,274 | 1/1982 | Agui et al. | 364/515 |
| 4,538,189 | 8/1985 | Saito et al. | 358/280 |
| 4,720,750 | 1/1988 | Watanabe | 358/300 |
| 4,899,227 | 2/1990 | Yamada | 358/452 |
| 4,908,716 | 3/1990 | Sakano | 358/453 |

Primary Examiner—David K. Moore
Assistant Examiner—Daniel Santos
Attorney, Agent, or Firm—Mason, Fenwick & Lawrence

[57] ABSTRACT

A marked region recognition apparatus recognizes an arbitrary marked region of a document image from a mark signal which indicates whether or not there exists a mark which indicates the marked region. The marked region recognition apparatus comprises a first storing part for storing the mark signal for at least one scanning line, a second storing part for storing a coordinate in a main scanning direction where the marked region ends for each scanning line based on the mark signal stored in the first storing part, and a recognition part for recognizing an inside and an outside of the marked region and producing a marked region signal which indicates the inside or the outside of the marked region for a present scanning line responsive to a state of the marked region of a previous scanning line, which state is read out from the first and second storing parts.

12 Claims, 7 Drawing Sheets

MARKED REGION RECOGNITION APPARATUS

BACKGROUND OF THE INVENTION

The present invention generally relates to marked region recognition apparatuses and more particularly to a marked region recognition apparatus which can designate a region of a document image by a mark and carry out different image processings inside and outside the designated region. The marked region recognition apparatus is especially suited for use in an image processing part of a digital copying machine.

In a digital copying machine, a document image data which is read from a document is subjected to an image processing in the form of an electrical signal. For this reason, the digital copying machine is capable of making image processing and image editing which cannot be made on an analog copying machine. Conventionally, there is a digital copying machine which carries out different image processings inside and outside an arbitrary closed region of a document image which is marked by a marker pen or the like. In such a digital copying machine, it is possible to carry out image processings such as erasing the inside of the marked region and turning over the black and white inside of the marked region. In order to carry out such image processings, it is necessary to recognize the inside and the outside of the marked region which is the arbitrary closed region surrounded by the mark.

For example, a Japanese Laid-Open Patent Application No. 61-109374 proposes a marked region recognition apparatus. According to this proposed marked region recognition apparatus, there is provided a mark detection means for detecting a mark from a document image data which is read by a reading means and is continuous in a main scanning direction. The marked region is recognized by switching a marked region recognition result as the inside and the outside of the marked region every time a mark signal ends. In addition, the marked region recognition results for one line are stored, and no mark region is recognized unless the mark signal is obtained when a previous line is not a marked region.

Figure 1A:
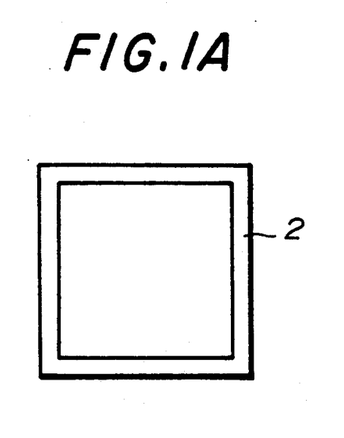
FIGS. 1A and 1B respectively are diagrams for explaining a rectangular region and a marked region which is recognized by the proposed marked region recognition apparatus.
Figure 1B:
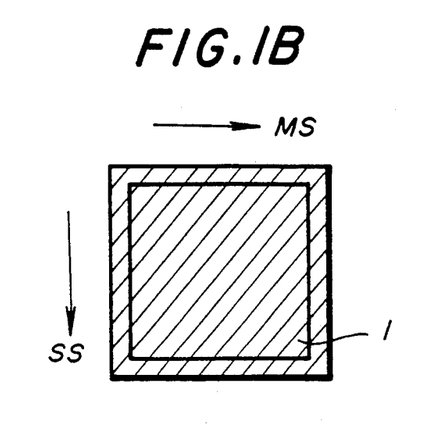
Figure 2A:
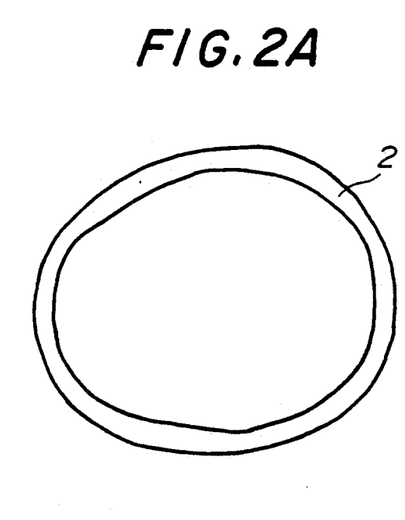
FIGS. 2A and 2B respectively are diagrams for explaining a non-rectangular region and a marked region which is recognized by the proposed marked region recognition apparatus.

However, the proposed marked region recognition apparatus suffers from the following disadvantages. That is, when a rectangular region is marked by a mark 2 as shown in FIG. 1A, it is possible to normally process this region and recognize the inside of a marked region 1 as indicated by a hatching in FIG. 1B. However, when a non-rectangular region is marked by the mark 2 as shown in FIG. 2A, the inside of the marked region 1 is erroneously recognized as indicated by a hatching in FIG. 2B.

Figure 2B:
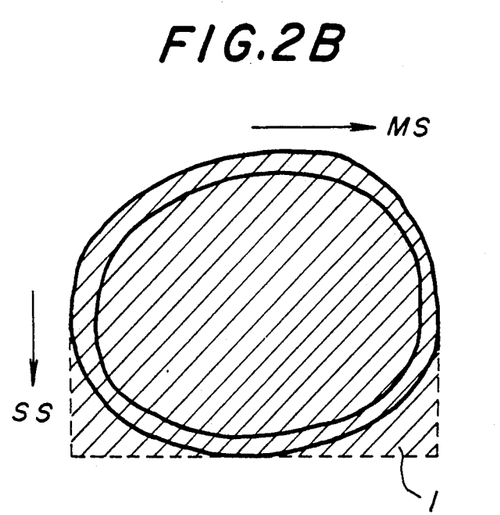
Figure 3A:
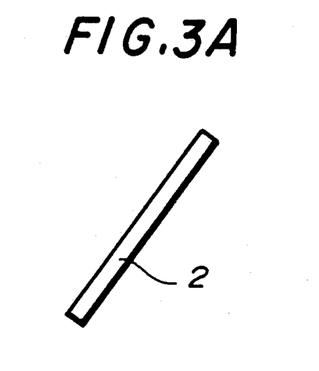
FIGS. 3A and 3B respectively are diagrams for explaining a non-closed region and a marked region which is recognized by the proposed marked region recognition apparatus.
Figure 3B:
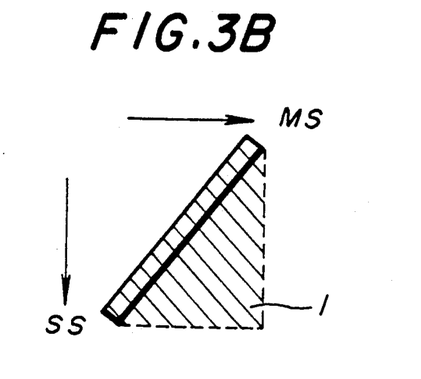

On the other hand, when the mark 2 does not mark a closed region as shown in FIG. 3A, the marked region 1 is erroneously recognized as indicated by a hatching in FIG. 3B. In FIGS. 1B, 2B and 3B, MS denotes a main scanning direction and SS denotes a sub scanning direction.

Therefore, in order to prevent an erroneous recognition of the marked region, it is necessary to restrict the shape of the mark and also limit the user who makes the marking to a person familiar with the rules of the marking.

SUMMARY OF THE INVENTION

Accordingly, it is a general object of the present invention to provide a novel and useful marked region recognition apparatus in which the problems described above are eliminated.

Another and more specific object of the present invention is to provide a marked region recognition apparatus for recognizing an arbitrary marked region of a document image from a mark signal which indicates whether or not there exists a mark which indicates the marked region for each scanning line of the document image, the mark signal being derived from an image data which is obtained by successively reading the document image in a main scanning direction, the marked region recognition apparatus comprising first storing means for storing the mark signal for at least one scanning line, second storing means for storing a coordinate in a main scanning direction where the marked region ends for each scanning line based on the mark signal stored in the first storing means, and recognition means for recognizing an inside and an outside of the marked region and producing a marked region signal which indicates the inside or the outside of the marked region for a present scanning line responsive to a state of the marked region of a previous scanning line, the state being read out from the first and second storing means. According to the marked region recognition apparatus of the present invention, it is possible to prevent an erroneous recognition of the marked region even when the marked region has an unusual shape, and the inside and the outside of the marked region can be detected accurately. Accordingly, it is unnecessary to restrict the shape of the mark and there is no need to limit the user who makes the marking to a person familiar with the rules of the marking.

Other objects and further features of the present invention will be apparent from the following detailed description when read in conjunction with the accompanying drawings.

DESCRIPTION OF THE PREFERRED EMBODIMENTS

First, a general description will be given of the operating principle of a marked region recognition apparatus according to the present invention. The marked region recognition apparatus uses an output image data of an image reader which makes a scan in a predetermined direction to read an arbitrary region of a document image which is indicated by a mark, and recognizes the inside and the outside of the marked region using an output detection result of a mark detection circuit which detects the existence of a mark. The marked region recognition apparatus comprises a storing means for storing detection results of the mark detection circuit for one line, a coordinate storing means for storing a coordinate in a main scanning direction where the marked region ends for each line, and recognition means for recognizing the marked region from the state of the marked region of the previous line stored in the two memory means. In other words, the present invention recognizes the marked region from the state of the marked region of the previous line, that is, particularly by using the coordinate in the main scanning direction where the marked region ends in the previous line.

Figure 4:
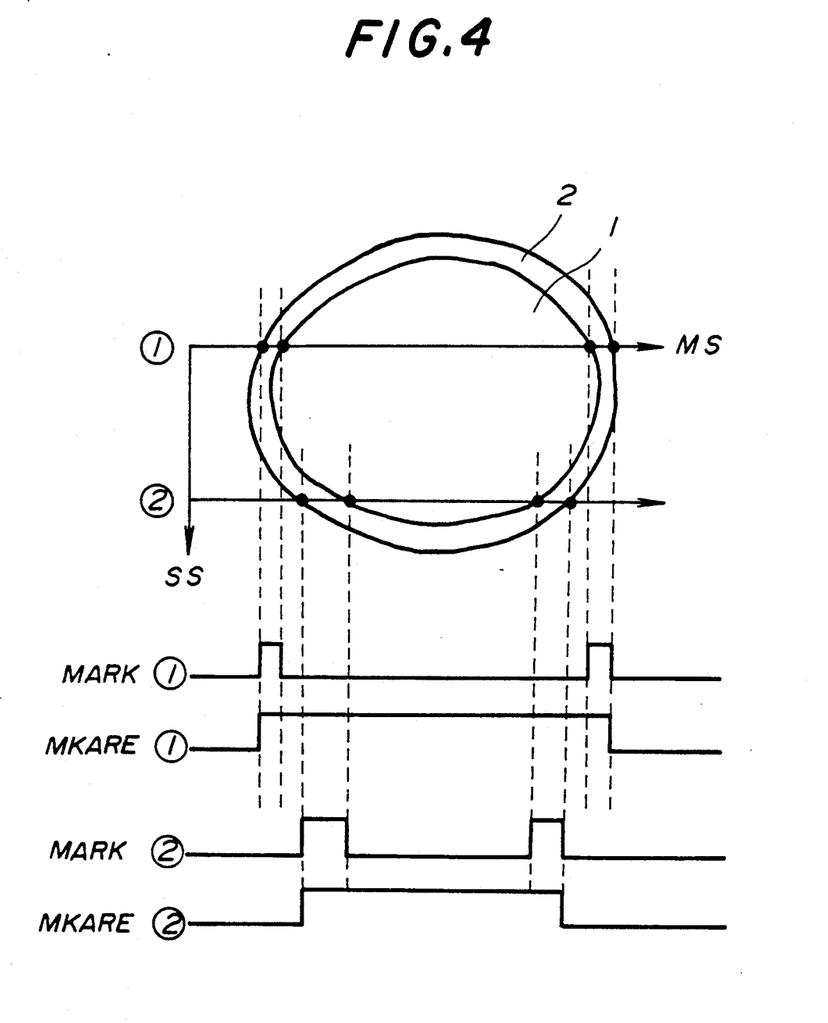
FIGS. 4 and 5 are diagrams for explaining a mark signal and a marked region signal.
Figure 5:
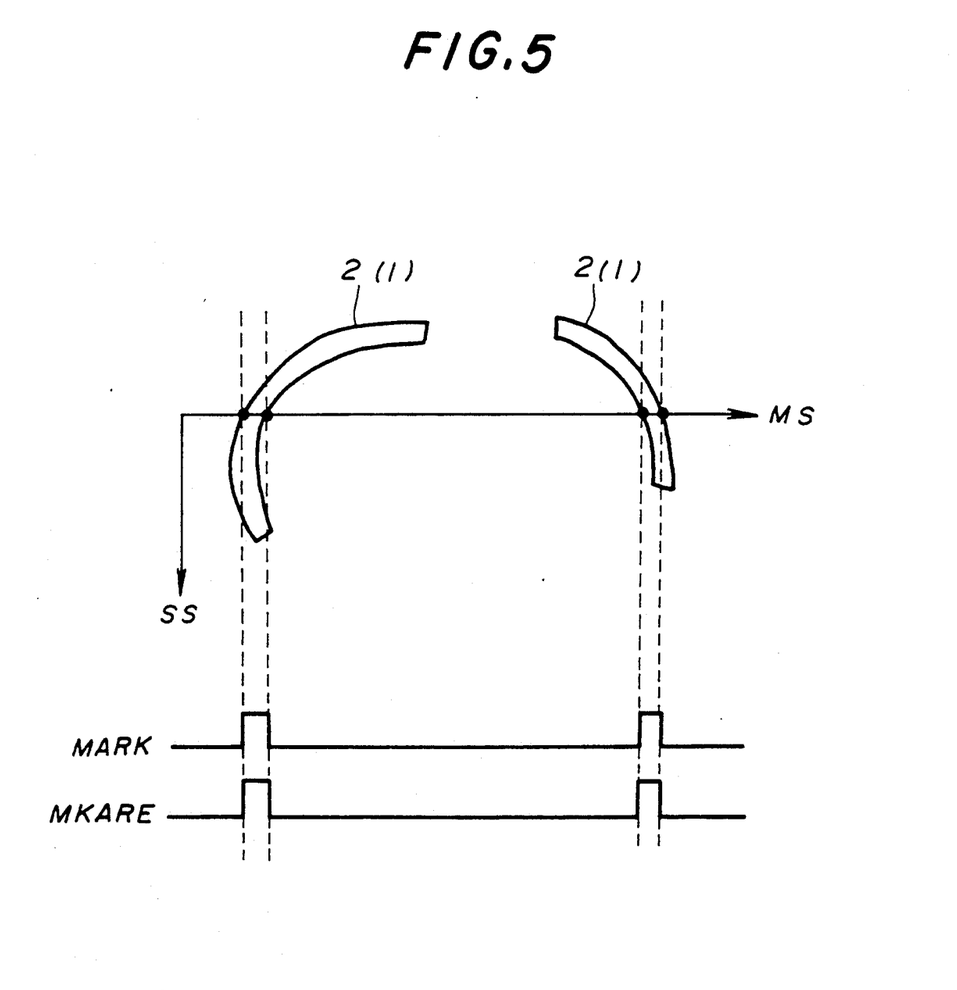

A description will now be given of the relationship between a mark signal and a marked region signal, by referring to FIGS. 4 and 5. FIGS. 4 and 5 respectively show the mark signal and the marked region signal for respective cases where the image reading means reads the marked region in the predetermined direction. A mark signal MARK has a level which is dependent on whether or not the mark 2 exists. A marked region signal MKARE is obtained as a result of recognizing the marked region 1 and has a level which is dependent on whether the region is inside or outside of the marked region 1. The present invention is characterized by a circuit which forms the marked region signal MKARE from the mark signal MARK.

In FIG. 4, the mark 2 surrounds a closed region. For this reason, the region changes in a sequence "outside", "inside" and "outside" of the marked region 1 in each of lines ① and ② which scan in the main scanning direction MS, and the marked region signal MKARE indicates the inside of the marked region 1 from the first mark signal MARK to the next mark signal MARK. But in FIG. 5, the mark 2 does not surround a closed region. In this case, the mark signal MARK is the same as that shown in FIG. 4, but the marked region signal MKARE indicates the marked region 1 only during an interval in which the mark signal MARK indicates the existence of the mark 2.

Figure 6:
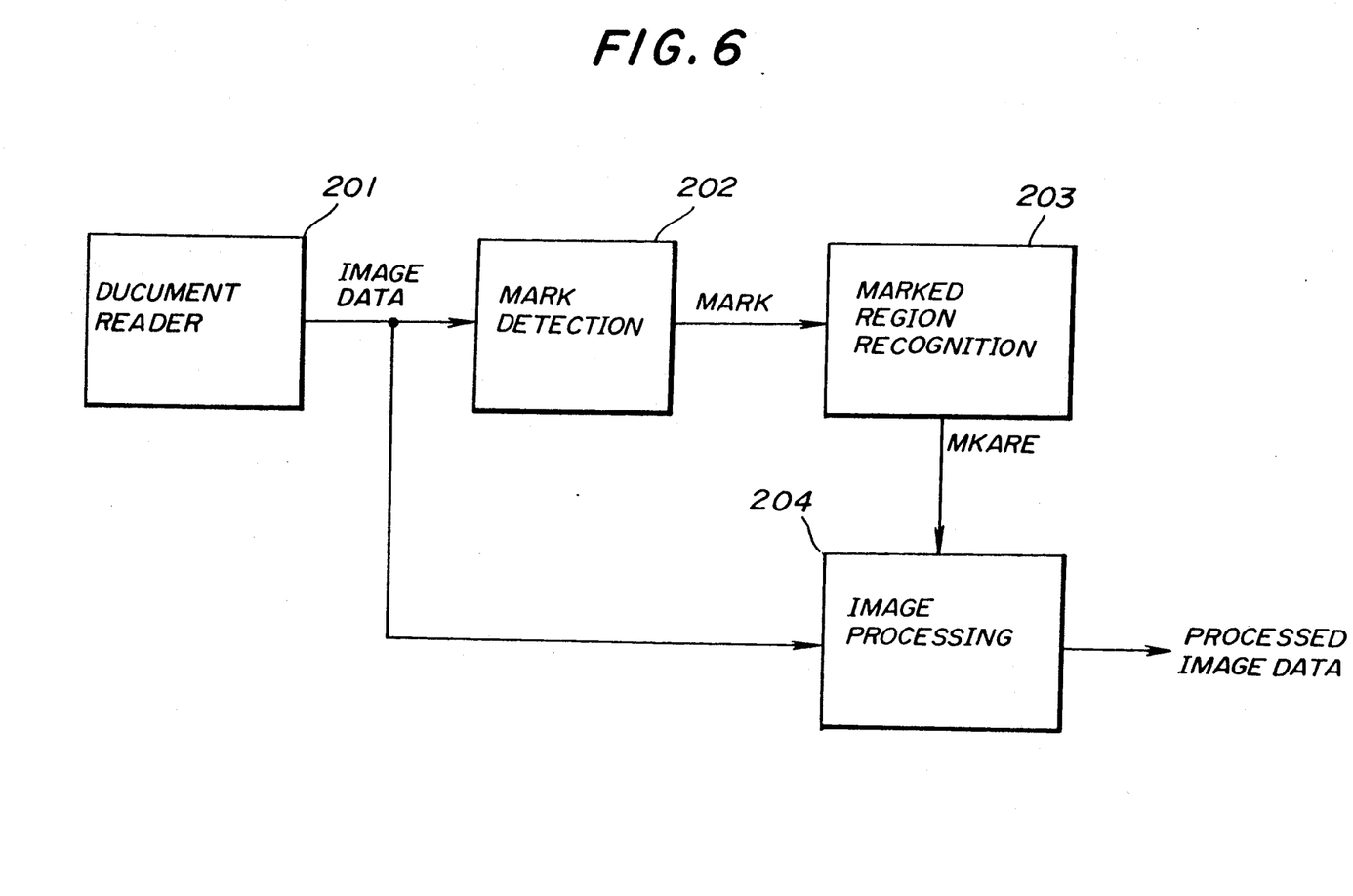
FIG. 6 is a system block diagram generally showing a digital copying machine to which the present invention may be applied.

FIG. 6 generally shows a digital copying machine to which the marked region recognition apparatus according to the present invention may be applied. In FIG. 6, the digital copying machine comprises a document reader 201, a mark detection circuit 202, a marked region recognition circuit 203, and an image processing circuit 204 which are coupled as shown. An image data which is read from a document by the document reader 201 is continuous in the main scanning direction MS. This image data is supplied to the mark detection circuit 202 and the image processing circuit 204. The mark detection circuit 202 detects the mark itself from the image data and produces the mark signal MARK based on the detection. This mark detection circuit 202 is known. The mark signal MARK output from the mark detection circuit 202 is supplied to the marked region recognition circuit 203 which produces the marked region signal MKARE which distinguishes the inside and the outside of the closed region which is surrounded by the mark. The marked region signal MKARE output from the marked region recognition circuit 203 is supplied to the image processing circuit 204 and controls the processing content of the image processing circuit 204, so that different image processings are carried out between the inside and the outside of the marked region. A processed image data is output from the image processing circuit 204.

Figure 7:
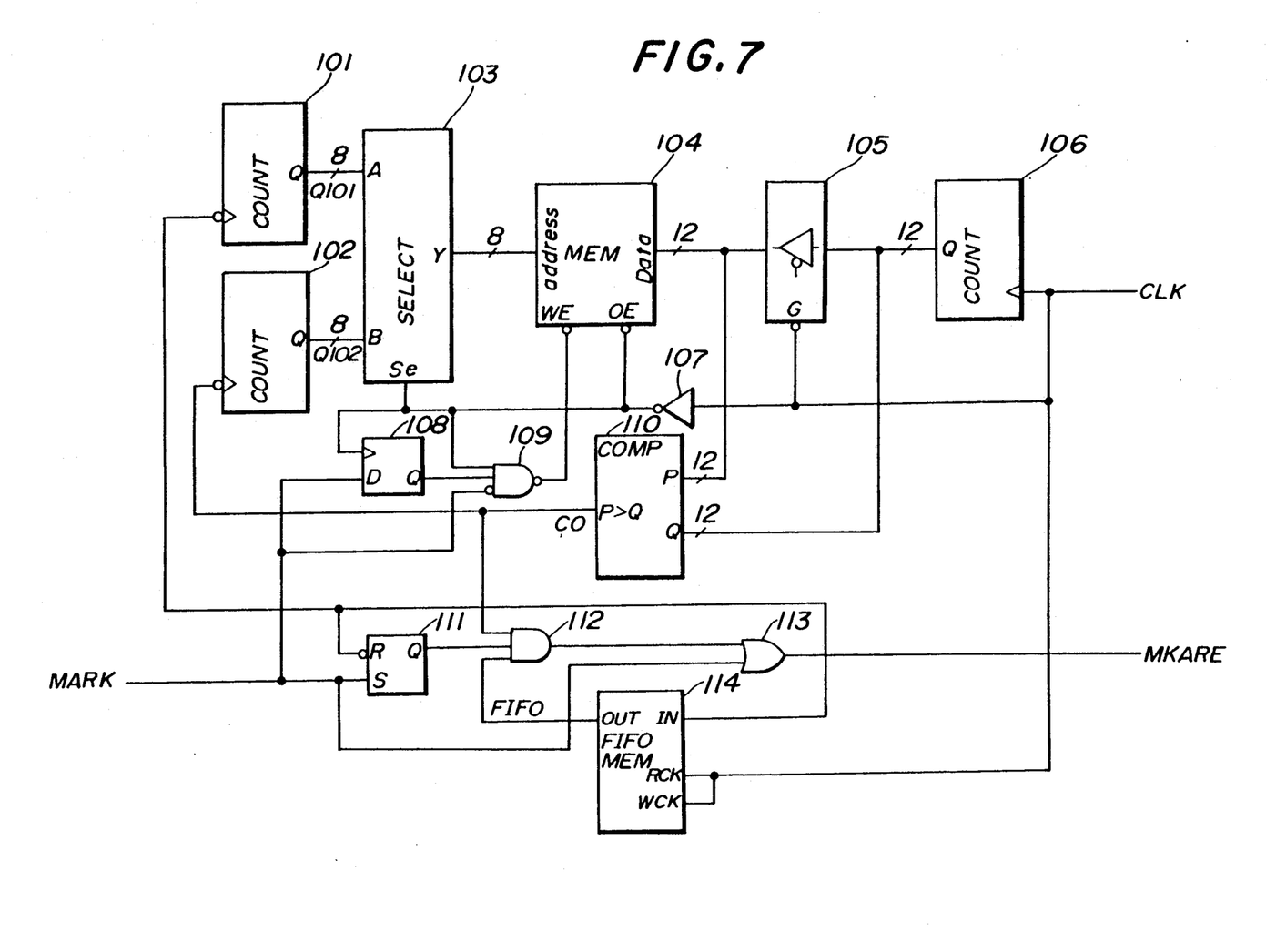
FIG. 7 is a system block diagram showing an embodiment of a marked region recognition apparatus according to the present invention.

Next, a description will be given of an embodiment of the marked region recognition apparatus according to the present invention, by referring to FIG. 7. In FIG. 7, the mark signal MARK and a clock signal CLK are external signals which are received from outside the marked region recognition apparatus. For example, the mark signal MARK is obtained from the mark detection circuit 20 shown in FIG. 6 when the marked region recognition circuit 203 corresponds to the marked region recognition apparatus of this embodiment. The mark signal MARK has a high level when the mark 2 exists and has a low level when no mark 2 exists. The clock signal CL is sometimes referred to as an image clock signal and is synchronized to the image data, the mark signal MARK and the like. The marked region recognition apparatus outputs the marked region signal MKARE which has a high level to indicate the inside of the marked region 1 and has a low level to indicate the outside of the marked region 1. For example, the marked region signal MKARE is supplied to the image processing circuit 204 shown in FIG. 6.

The mark signal MARK is supplied to an RS flip-flop 111 and an OR circuit 113. The OR circuit 113 outputs the marked region signal MKARE. Hence, the marked region signal MKARE has the high level when the mark signal MARK has the high level. In other words, the marked region 1 is detected while the mark 2 is detected.

For the sake of convenience, it is assumed that the mark signal MARK changes from the high level to the low level. In this case, the RS flip-flop 111 is set every time the mark signal MARK is applied to a set terminal S thereof and is reset every time the marked region 1 ends in response to the marked region signal MKARE which is applied to a reset terminal R thereof. Accordingly, even when the level of the mark signal MARK becomes low, the RS flip-flop 111 maintains the set state unless the marked region 1 ends. In other words, the RS flip-flop 11; detects the start of the marked region 1.

An AND circuit 112 determines the end of the marked region 1. The AND circuit 112 ends the marked region 1 when an output signal level of one of a comparator 110 and a FIFO memory 114 becomes low. The FIFO memory 114 stores the state of the marked region 1 for a previous scanning line. For this reason, when a picture element position of a previous scanning line is recognized as the marked region 1, a high-level signal is output from the AND circuit 112 at a picture element position of a present scanning line which corresponds to the picture element position of the previous scanning line, and this condition does not determine the end of the marked region 1. On the other hand, when the picture element position of the previous scanning line is not recognized as the marked region 1, a low-level signal is output from the AND circuit 112 and the marked region 1 ends.

A coordinate in the main scanning direction MS where the marked region 1 ends in the previous scanning line is supplied from a coordinate memory 104 to an input terminal P of the comparator 110. An output signal of a main scan counter 106 is supplied to an input terminal Q of the comparator 110. The comparator 110 outputs a high level signal CO when P>Q. In other words, the marked region 1 continues until the main scan position on the present scanning line reaches the position which corresponds to the end position of the marked region 1 on the previous scanning line because the comparator 110 continues to output the high-level signal, but the marked region 1 ends thereafter since the comparator 110 outputs a low-level signal CO.

The coordinate memory 104 stores the coordinate in the main scanning direction MS where the marked region 1 ends in the previous scanning line. Other circuits shown in FIG. 7 are used to control the coordinate memory 104.

The coordinate memory 104 alternately repeats a read cycle and a write cycle. The read cycle is carried out during the high-level period of the clock signal CLK. During this read cycle, a data selector 103 selectively supplies an output signal Q102 of a memory read counter 102 to an address terminal of the coordinate memory 104. A low-level output enable signal OE is supplied to the coordinate memory 104, and the data which is read out from the coordinate memory 104 is supplied to the input terminal P of the comparator 110. In this state, a 3-state gate 105 is prohibited from making an output.

The write cycle of the coordinate memory 104 is carried out during the low-level period of the clock signal CLK. During this write cycle, the data selector 103 selectively supplies an output signal Q101 of a memory write counter 101 to the address terminal of the coordinate memory 104. A high-level output enable signal OE is supplied to the coordinate memory 104, the 3-state gate 105 is enabled to make an output. Hence, an output signal of the main scan counter 106 is supplied to a data terminal of the coordinate memory 104. When a low-level write enable signal WE is supplied to the coordinate memory 104 in this state, the coordinate memory 104 writes the main scan coordinate into the coordinate memory 104. The level of the write enable signal WE does not become low unless the mark signal MARK change from the high level to the low level, due to the provision of a D flip-flop 108 and a NAND circuit 109.

Because the marked region signal MKARE is applied to a clock terminal of the memory write counter 101, the memory write counter 101 counts up every time the marked region 1 ends. On the other hand, because the output signal of the comparator 110 is applied to a clock terminal of the memory read counter 102, the memory read counter 102 counts up when the coordinate of the present scan position reaches the coordinate in the main scanning direction MS where the marked region 1 ends in the previous scanning line.

Figure 8:
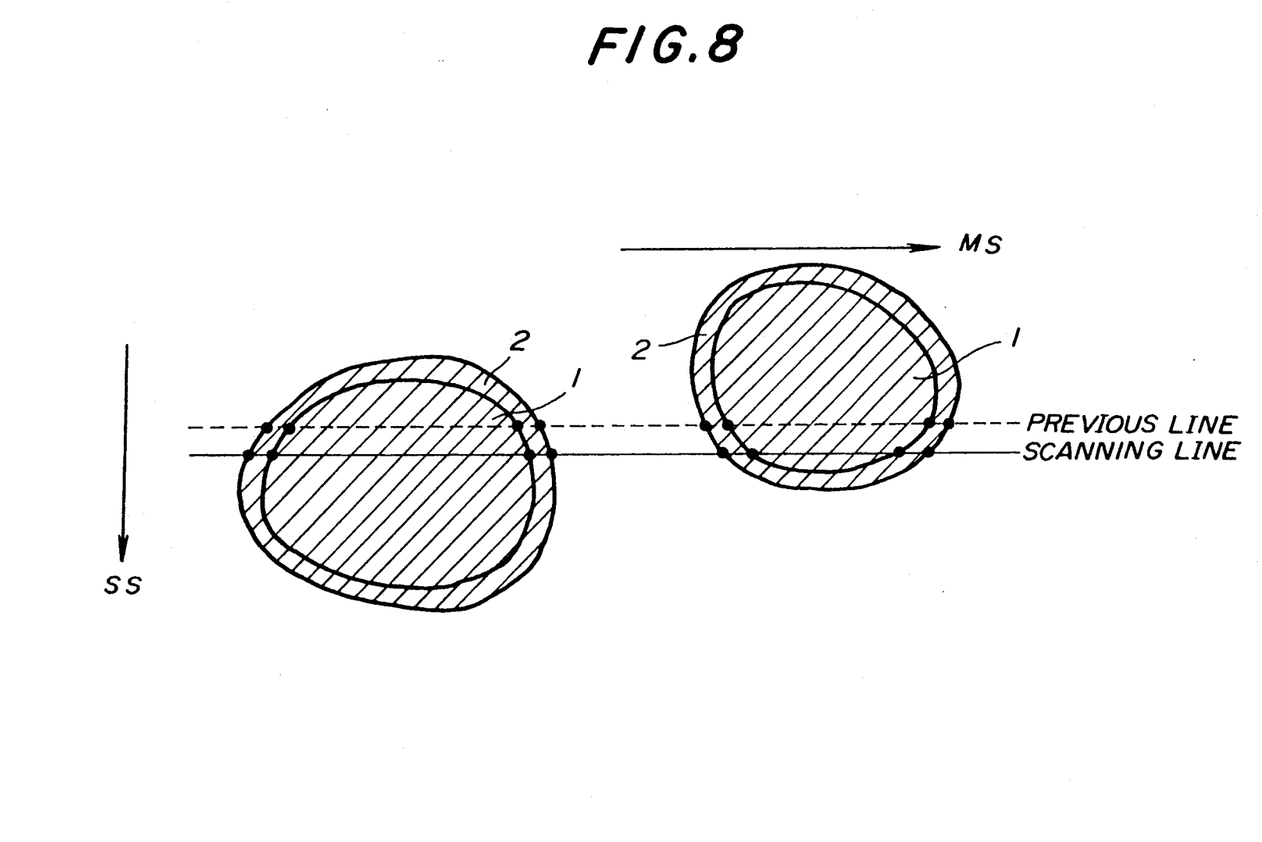
FIG. 8 shows a relationship between a mark and a marked region.
Figure 9:
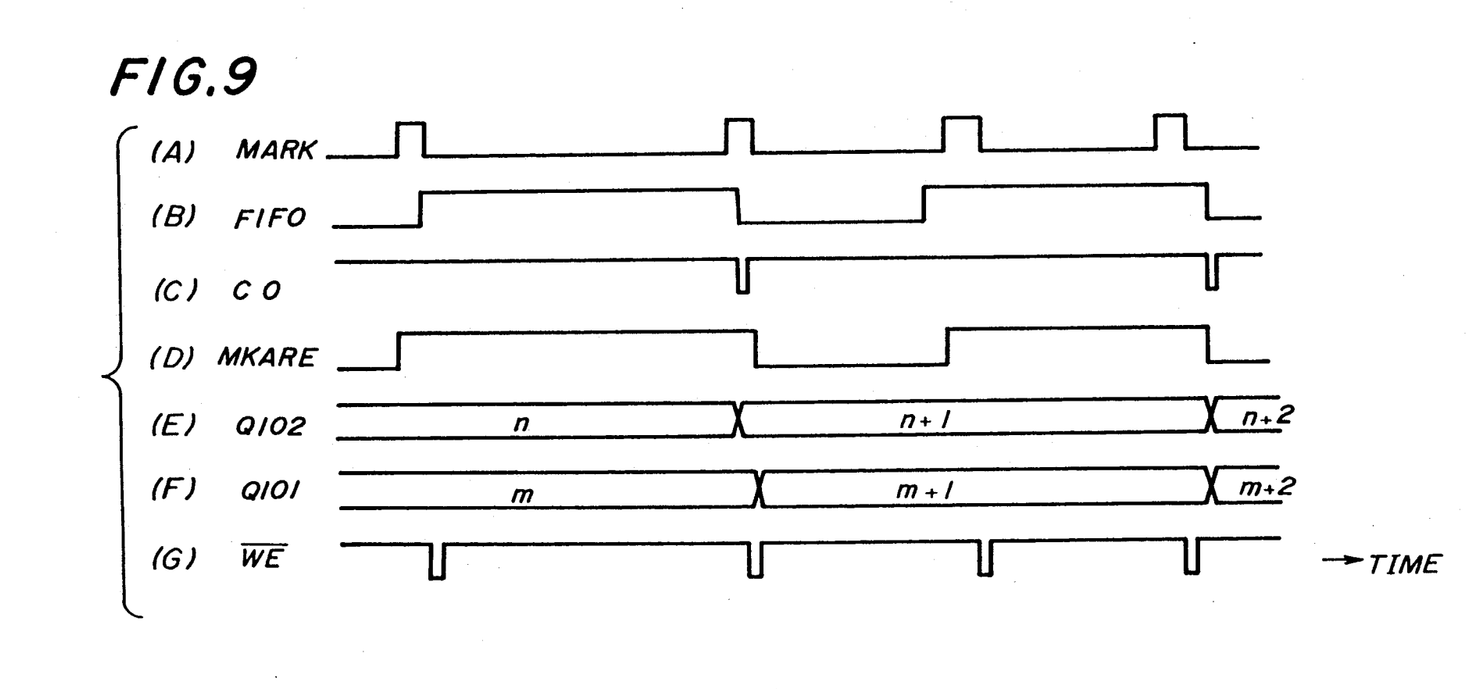
FIGS. 9(A) through 9(G) ar timing charts for explaining a processing timing of the embodiment for the mark and the marked region shown in FIG. 8.

FIG. 8 shows a relationship between the mark 2 and the marked region 1, and FIGS. 9(A) through 9(G) are timing charts for explaining a processing timing of the embodiment for the mark 2 and the marked region 1 shown in FIG. 8. FIG. 9(A) shows the mark signal MARK, FIG. 9(B) shows the output signal FIFO of the FIFO memory 114, FIG. 9(C) shows the output signal CO of the comparator 110, and FIG. 9(D) shows the marked region signal MKARE. FIG. 9(E) shows the output signal Q102 of the memory read counter 102, FIG. 9(F) shows the output signal Q101 of the memory write counter 101, and FIG. 9(G) shows the write enable signal $\overline{WE}$. As may be seen from FIGS. 8 and 9(D), the interval between two successive rising and falling edges of the marked region signal MKARE corresponds to the marked region 1 which is indicated by the hatching. In other words, the marked region signal MKARE has the high level from a start of a first time period in which the mark signal MARK has the high level to an end of a next time period in which the mark signal MARK has the high level.

In this embodiment, the address of the coordinate memory 104 has 8 bits. Hence, it is possible to recognize a maximum of 256 marked regions 1 on one scanning line.

According to this embodiment, it is possible to correct an erroneous mark detection which is made in the mark detection circuit 202 due to dirt or the like on the document and appropriately recognize the marked region 1.

Further, the present invention is not limited to these embodiments, but various variations and modifications may be made without departing from the scope of the present invention.

What is claimed is:

1. A marked region recognition apparatus for recognizing one or more marked regions of a document image based on a mark signal which indicates whether or not there exists a mark which indicates the marked region for each scanning line of the document image, the mark signal being derived from image data which is obtained by successively reading the document image in a main scanning direction, the marked region recognition apparatus comprising:

first means, responsive to the mark signal, for outputting a first region signal until the marked region ends;

second means for (a) storing a marked region signal of a line which is at least one line prior to a certain line on which a predetermined coordinate exists, and (b) outputting a second region signal when a coordinate is in a marked region, the coordinate being identical to the predetermined coordinate but related to the line which is one line prior to the certain line;

third means for storing an end point of the marked region of the line prior to the line having the predetermined coordinate;

fourth means, operatively connected to the third means, for outputting a third region signal when the predetermined coordinate is smaller than the end point of the marked region of one line prior to the predetermined coordinate;

fifth means, responsive to the first, second, and fourth means, for outputting a fourth region signal when all of the first, second and third region signals are received; and sixth means, responsive to the fourth region signal of the fifth means or to the mark signal, for outputting the marked region signal when either the mark signal or the fourth region signal is received.

2. The marked region recognition apparatus of claim 1, wherein:

the first means includes an R–S flip-flop.

3. The marked region recognition apparatus or claim 1, wherein:

the second means includes a FIFO memory.

4. The marked region recognition apparatus or claim 1, wherein:
   the third means includes a read-write memory.

5. The marked region recognition apparatus of claim 1, wherein:
   the fourth means includes a comparator.

6. The marked region recognition apparatus of claim 1, wherein:
   the fifth means includes an AND circuit.

7. The marked region recognition apparatus of claim 1, wherein:
   the sixth means includes an OR circuit.

8. The marked region recognition apparatus of claim 1, wherein:
   the second and fourth means respectively count the coordinate in the scanning direction in response to a clock signal.

9. The marked region recognition apparatus of claim 1, wherein:
   the first means includes an R-S flip-flop;
   the second means includes a FIFO memory;
   the third means includes a read-write memory;
   the fourth means includes a comparator;
   the fifth means includes an AND circuit; and
   the sixth means includes an OR circuit.

10. The marked region recognition apparatus of claim 1, further comprising:
    seventh means for switching the coordinate of the end point of the marked region output from the third means in response to the output signal of said fourth means.

11. The marked region recognition apparatus of claim 10, wherein the seventh means includes:
    a selector having first and second inputs;
    a first counter connected to the first input of the selector, and
    a second counter connected to the second input of the selector.

12. The marked region recognition apparatus of claim 10, wherein:
    the first means includes an R-S flip-flop;
    the second means includes a FIFO memory;
    the third means includes a read-write memory; p1 the fourth means includes a comparator;
    the fifth means includes an AND circuit;
    the sixth means includes an OR circuit; and
    the seventh means includes a selector having first and second inputs, a first counter connected to the first input of the selector, and a second counter connected to the second input of the selector.

* * * * *